US008787945B1

(12) United States Patent
Yellin et al.

(10) Patent No.: US 8,787,945 B1
(45) Date of Patent: *Jul. 22, 2014

(54) CORRECTION OF TIMING ERRORS TO ENABLE LONG SLEEP TIMES

(71) Applicant: Marvell International Ltd., Hamilton (BM)

(72) Inventors: Daniel Yellin, Ra'anana (IL); Ronen Mayrench, Ra'anana (IL); Yona Perets, Ra'anana (IL)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,412

(22) Filed: Aug. 5, 2013

Related U.S. Application Data

(63) Continuation of application No. 13/601,699, filed on Aug. 31, 2012, now Pat. No. 8,504,079, which is a continuation of application No. 12/628,038, filed on Nov. 30, 2009, now Pat. No. 8,260,328.

(60) Provisional application No. 61/120,667, filed on Dec. 8, 2008.

(51) Int. Cl.
H04W 68/00 (2009.01)
H04M 1/00 (2006.01)

(52) U.S. Cl.
USPC .................................. 455/458; 455/574

(58) Field of Classification Search
USPC ........ 370/331; 455/458, 423–425, 550.1, 574
See application file for complete search history.

(56) References Cited

U.S. PATENT DOCUMENTS

| 7,551,911 | B2 | 6/2009 | Shohara et al. |
| 7,974,647 | B2 | 7/2011 | Ho |
| 8,073,470 | B1 | 12/2011 | Collins et al. |
| 8,260,328 | B1 * | 9/2012 | Yellin et al. ................... 455/458 |
| 8,504,079 | B1 * | 8/2013 | Yellin et al. ................... 455/458 |
| 2004/0183723 | A1 | 9/2004 | Bhatia et al. |
| 2007/0189428 | A1 | 8/2007 | Knerr et al. |
| 2008/0310396 | A1 | 12/2008 | Park et al. |
| 2009/0154385 | A1 | 6/2009 | Makhija et al. |

* cited by examiner

Primary Examiner — Brandon Miller

(57) ABSTRACT

A mobile user equipment includes a user equipment clock and a dual mode time tracker. The clock periodically wakes up the user equipment. The dual mode time tracker uses a serving cell reference signal to correct timing errors of the user equipment clock with respect to a network clock while timing errors remain minimal and otherwise uses a serving cell synchronization signal to correct timing errors of the user equipment clock. The dual mode time tracker also sets a next wakeup time as a function at least of the size of the timing errors.

18 Claims, 6 Drawing Sheets

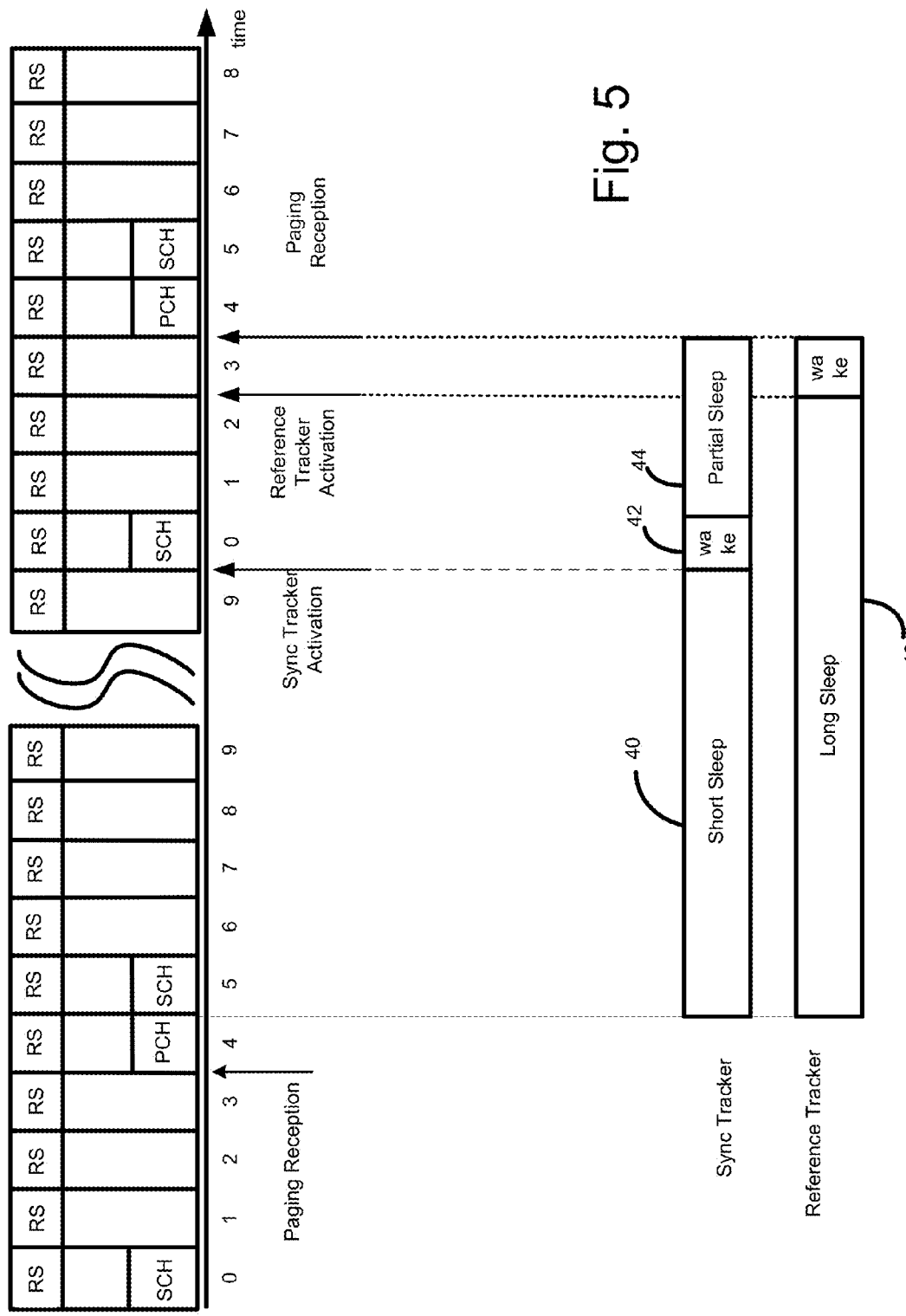

CORRECTION OF TIMING ERRORS TO ENABLE LONG SLEEP TIMES

CROSS-REFERENCE TO RELATED APPLICATIONS

The present disclosure is a continuation of and claims priority to U.S. patent application Ser. No. 13/601,699, filed Aug. 31, 2012, now U.S. Pat. No. 8,504,079, issued Aug. 6, 2013, which is a continuation of U.S. patent application Ser. No. 12/628,038, filed Nov. 30, 2009, now U.S. Pat. No. 8,260,328, issued Sep. 4, 2012, which is a non-provisional of and claims priority to U.S. Provisional Patent Application No. 61/120,667, filed Dec. 8, 2008, which are incorporated herein by reference.

FIELD OF THE INVENTION

The present invention generally relates to wireless communication, in general, and in particular to power saving approaches to increase battery life of a mobile device in a cellular network.

BACKGROUND

Cellular communication networks typically include a number of base stations, where each base station serves a "cell", and multiple mobile units, (referred to herein as user equipment (UEs)), that may move through and between the cells. The 3rd Generation Partnership Project (3GPP) is presently defining various communication standards and protocols, including standards and protocols for the emerging next generation, LTE (Long Term Evolution) Advanced cellular telecommunication standard.

Cellular communications systems may require mobile units to communicate regularly with the base stations, including during active voice or data calls, as well as when not actively engaged in a call. This regular communication utilizes battery power and may drain power from the battery. In LTE and other standards, a UE may periodically shut down various receiver modules when not needed, thereby entering an "idle" or "standby" mode, to reduce its power consumption. Entering the idle or standby mode is also called "going to sleep".

However, even when in idle mode, the UE still needs to periodically wake up, for example, to monitor signals that are transmitted at specific times, called paging slots, and to determine if it needs to fully wake up and receive a call. The UE may also utilize paging slots to receive additional signals, to update its knowledge of the network, to change cell information if the UE is moving, etc. In LTE, for instance, the periodicity of paging slots is up to 2.56 sec.

When in idle mode, a UE may turn off various components other than those components needed to maintain a timing synchronization between the UE and a network. A "slow clock unit" in the UE typically is responsible for waking the UE after a sleep period. It may be based on a relatively inexpensive and power efficient crystal. However, slow clock units may be somewhat inaccurate, which might result in the UE waking up at incorrect times. For timing correction the UE may use known signals that the base station periodically transmits. Normally, the UE wakes up the time tracking module with enough time to correct any timing errors before the expected receipt of the paging signal.

SUMMARY

There is provided, in accordance with an embodiment of the disclosure, a method for waking up mobile user equipment from an idle mode. The method includes periodically waking up the user equipment to receive a paging signal. The waking up is based on a clock signal from a user equipment clock, and may be used for example to prepare the user equipment to receive a paging signal. A serving cell reference signal is used to correct timing errors of the user equipment clock with respect to a network clock while timing errors remain minimal and otherwise using a serving cell synchronization signal to correct timing errors of the user equipment clock.

Moreover, in accordance with an embodiment of the disclosure, the method also includes selecting between the serving cell synchronization signal and the serving cell reference signal as a function of a threshold level based on the size of the timing error corrections and a number of times which the timing error corrections have remained above or below the threshold level.

Further, in accordance with an embodiment of the disclosure, the method includes selecting the synchronization signal when the user equipment transitions from an active call state to an idle state.

Still further, in accordance with an embodiment, the method includes selecting the reference signal after a temperature of the user equipment clock becomes stable.

Additionally, in accordance with an embodiment, setting a next wakeup time includes scheduling the next wake up time to occur at a time that enables receipt of a synchronization signal prior to a sub-frame of a next expected paging signal.

Alternatively, in accordance with an embodiment, setting a next wakeup time includes scheduling the next wake up time to occur at a time that enables receipt of a synchronization signal concurrently with a next paging signal and storing at least paging signals for processing after processing of the synchronization signal.

There is also provided, in accordance with an embodiment, a mobile user equipment including a user equipment clock and a dual mode time tracker. The user equipment clock periodically wakes up the user equipment. The dual mode time tracker is configured to use a serving cell reference signal to correct timing errors of the user equipment clock with respect to a network clock while timing errors remain minimal and otherwise to use a serving cell synchronization signal to correct timing errors of the user equipment clock and to set a next wakeup time as a function at least of the size of the timing errors.

Moreover, in accordance with an embodiment of the disclosure, the dual mode time tracker includes a sync time tracker, a reference time tracker and a controller. The sync time tracker uses the serving cell synchronization signal to correct the timing errors. The reference time tracker uses the serving cell reference signal to correct the timing errors. The controller activates one of the sync time tracker and the reference time tracker as a function of a threshold level related to a magnitude of the timing errors and a length of time they have remained above or below the threshold level.

Further, in accordance with an embodiment, the controller includes a unit to select the synchronization signal when the user equipment transitions from an active state to a non-active state.

Still further, in accordance with an embodiment, the controller includes a unit to receive a temperature of the user equipment and to select the reference signal after a temperature of the user equipment becomes stable.

Moreover, in accordance with an embodiment, the user equipment includes a scheduler to schedule the next wake up time to occur at a time that enables receipt of a synchronization signal prior to a sub-frame of a next expected paging signal.

Additionally, in accordance with an embodiment, the user equipment includes a scheduler to schedule the next wakeup time to occur at a time that enables receipt of a synchronization signal concurrently with a next paging signal and also includes a storing unit to store at least paging signals for processing after processing of the synchronization signal.

There is also provided, in accordance with an embodiment of the disclosure, a method for waking up mobile user equipment. The method includes waking up a receiver module at a predetermined wakeup time prior to receiving a periodically transmitted paging message. As a function of the size of an expected timing error, one of a frequently transmitted reference signal and a less frequently transmitted synchronization signal is selected to correct a timing error of a user equipment clock unit with respect to a network clock. A next wakeup time is set before and close to an expected paging signal reception such that the reference signal can be used for time tracking if timing errors remain minimal and otherwise, the next wake time is set to the next expected synchronization signal prior to an expected paging signal.

Moreover, in accordance with an embodiment, the method also includes selecting between the synchronization signal and the reference signal as a function of a threshold level of the timing correction and the number of paging cycles that the timing errors have remained above or below the threshold level.

Further, in accordance with an embodiment, the selecting includes selecting the synchronization signal when the user equipment transitions from an active call state to an idle state.

Still further, in accordance with an embodiment, the selecting includes selecting the reference signal after a temperature of the user equipment clock becomes stable.

Additionally, in accordance with an embodiment, setting a next wake up time includes scheduling the next wake up time to occur at a time that enables receipt of a synchronization signal prior to a sub-frame of a next expected paging signal.

Alternatively, in accordance with an embodiment, setting a next wakeup time includes scheduling the next wake up time to occur at a time that enables receipt of a synchronization signal concurrently with a next paging signal and storing at least paging signals for processing after processing of the synchronization signal.

Finally, there is provided, in accordance with an embodiment of the disclosure, a mobile user equipment including a user equipment wakeup unit and a dual mode time tracker. The user equipment wake up unit wakes up a receiver module at a predetermined wake up time prior to receiving a periodically transmitted paging message. The dual mode time tracker, when awake, corrects a timing error of a user equipment clock unit with respect to a network clock with one of a frequently transmitted reference signal and a less frequently transmitted synchronization signal as a function of the size of expected timing errors. The wake up unit sets a next wakeup time to the next expected reference signal prior to an expected paging signal if timing errors remain minimal and to the next expected synchronization signal prior to an expected paging signal otherwise, based on the corrected time base of the user equipment.

BRIEF DESCRIPTION OF THE DRAWINGS

Embodiments of the present disclosure may best be understood with reference to the following figures, in which:

FIG. 5 is a timing diagram illustration of sleep times using the dual mode time tracker of FIG. 3.

Figure 1:
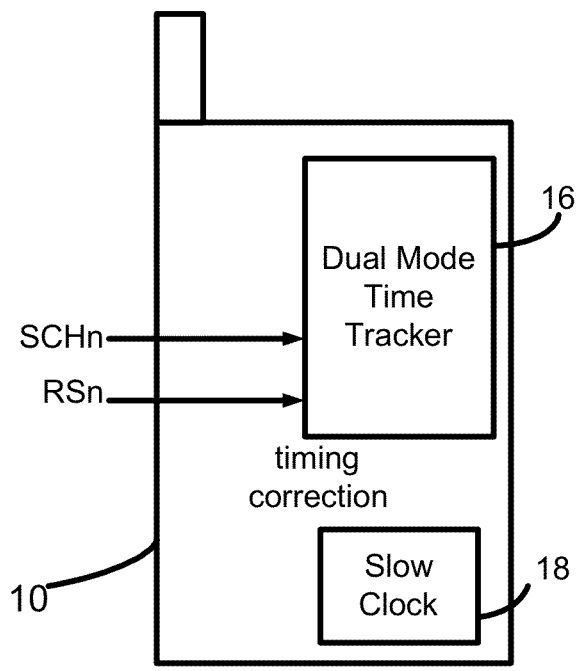
FIG. 1 is a block diagram illustration of a mobile device having a dual mode time tracker.

It is noted that for simplicity and clarity of illustration, elements shown in the figures have not necessarily been drawn to scale. Further, where considered appropriate, reference numerals are repeated among the figures to indicate corresponding or analogous elements.

DETAILED DESCRIPTION

In various cellular communication systems, such as LTE (long term evolution), the base station is configured to regularly transmit a synchronization signal (i.e. Primary SCH and Secondary SCH referred to here as SCH), which is conventionally employed to synchronize the UE to a cell.

The base station is also configured to regularly transmit a reference signal (RS), also known as a pilot signal. The reference signal may be transmitted more frequently than the synchronization signal and it may be used to determine parameters of the channel (which may change, for example, as the user equipment UE moves through the cell). The reference signal may also be used for time tracking.

In accordance with an embodiment, timing correction can be based on processing of known signals that are transmitted periodically from the base station to the UE. Two types of known signals, at least, are transmitted in LTE frame: reference symbols and synchronization signals. The LTE transmission frame structure generally includes 10 sub-frames each of length 1 ms. The reference symbols, also known as pilot symbols, are located in each sub-frame at specific OFDM symbols with known location over the entire frequency range in a scattered manner. The synchronization signals are located at specific sub-frames, i.e. sub-frame 0 and sub-frame 5. The synchronization signal has higher frequency resolution (i.e. located in adjacent resource elements) and in a limited frequency range. Note that according to the LTE standard, the LTE frequency range can vary in between 1.4 MHz-20 MHz and the synchronization signal can occupy only the middle 1.4 MHz frequency band.

In accordance with an embodiment of the present disclosure, the synchronization signal may be additionally used for time tracking within a cell, and it may also be used in conjunction with the reference signal. A UE may select one signal over the other as a function of time corrections and reception conditions. For example, the user equipment mobile device may select between the synchronization signal and the reference signal as a function of a threshold level based on the size of the time corrections and a number of times or a number of paging cycles during which the time corrections have remained above or below the threshold level. Alternatively, for example, the UE may select between the synchronization signal and the reference signal as a function of any other suitable estimation of the timing errors. As used herein, the term time corrections refers to time corrections made by the UE as well as any other suitable estimate of timing errors in a clock of the UE with respect to the network clock.

Reference is now made to FIG. 1, which illustrates a mobile device (called a "UE") 10, constructed and operative in accordance with an embodiment. UE 10 may comprise a dual mode time tracker 16 and a slow clock 18. Various components that may be typically found in a UE, but are not necessary for understanding the invention, are omitted to avoid obfuscating the teaching principles of this description. Although specifically described in the context of LTE, analogous principles may be adapted to other suitable wireless and cellular communication standards.

Dual mode time tracker 16 may utilize the synchronization signal SCHn or the reference signal RSn or both, to acquire and track the timing after a sleep period and, as a result, to receive the paging signal at the proper time and to calibrate or adjust the UE timing. In accordance with an embodiment of the disclosure, selection of one of the two signals for synchronization depends on a size of time corrections during one or more previous wake up periods during which UE 10 woke up. Scheduling of the next wake up unit uses the slow clock 18 unit after timing correction.

In accordance with an embodiment, slow clock 18 is configured to wake up user equipment mobile device at the appropriate time. In accordance with an embodiment, a next wake up time is determined based on which signal (synchronization signal or reference signal) is needed for the next time tracking operation. The dual mode time tracker 16 determines a timing correction and changes the time base of the UE to synchronize the UE to the network clock. The scheduling of the next wake up period is set according to the corrected time base of the UE and the required wake up timing for the next wake up, The slow clock 18 unit may update its internal state and configuration each wake up period to enable appropriate wake up timing.

Figure 2:
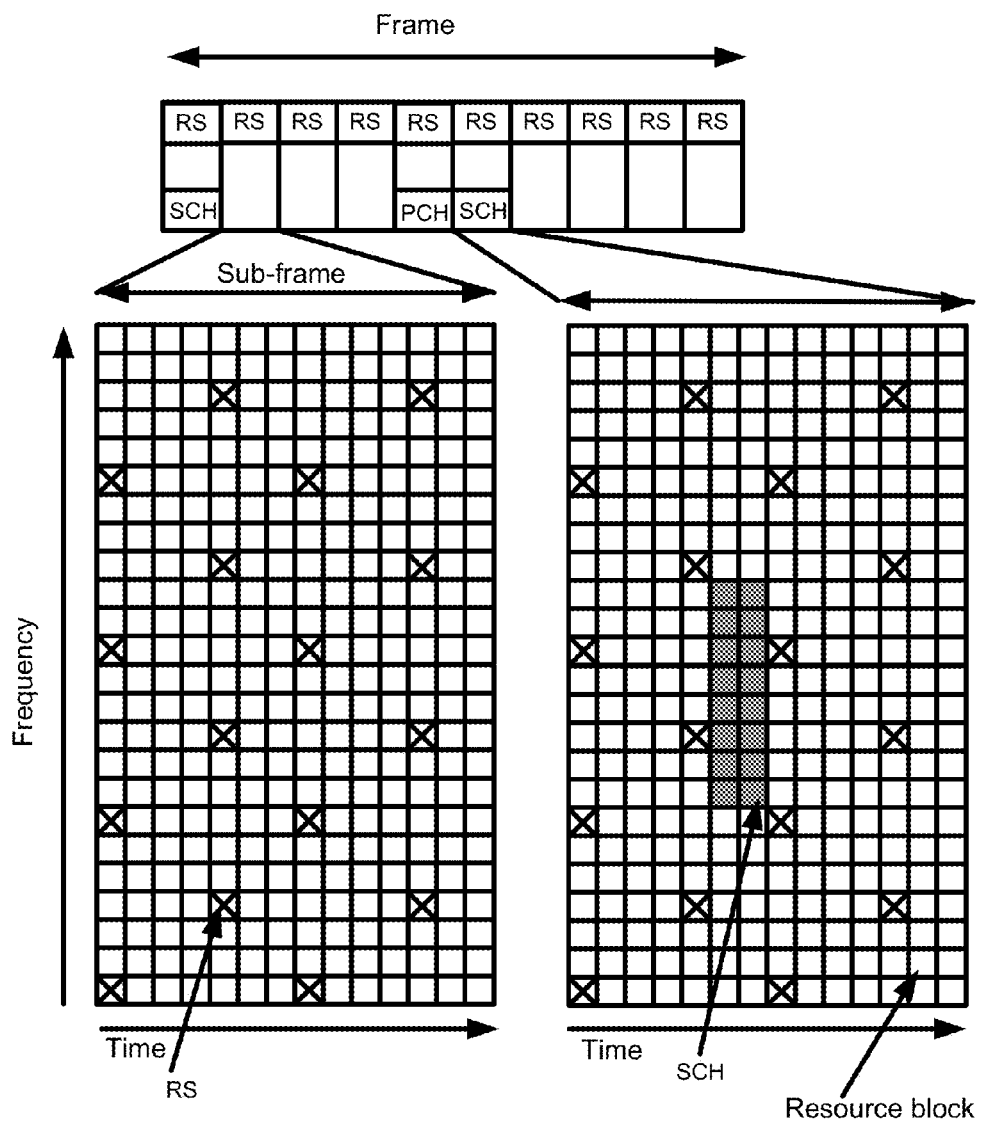
FIG. 2 is an illustration of time-frequency allocations in a frame for synchronization signals SCH and reference signals RS in accordance with an embodiment.

Reference is now made to FIG. 2 which illustrates transmission timing of synchronization signals SCH and reference signals RS and details of their transmission in a LTE configuration, in accordance with an embodiment of the disclosure. FIG. 2 shows an example of timing allocations in a frame of 10 sub-frames, where each sub-frame, or transmission time interval (TTI), is, for example, of 1 msec of length. RS signals may be transmitted at every sub-frame while synchronization signals SCH may be transmitted less frequently. In the example of FIG. 2, they are transmitted once every 5 msec. Synchronization signals SCH are thus less available than reference signals RS for correcting timing errors.

FIG. 2 also illustrates the transmission timing of a paging signal PCH which UE 10 has to be ready to receive. Paging signals PCH may be transmitted regularly. In LTE, there is a maximum interval of 2.56 sec between transmissions of paging signals PCH.

UE 10 is configured to wake up sufficiently prior to the transmission of a paging signal to update its timing and to calibrate its slow clock 18 for the next wake up period. In accordance with an embodiment, when UE 10 utilizes reference signals RS, which are transmitted at every sub-frame, UE 10 may wake up to receive the reference signal RS transmitted in several sub-frames immediately preceding the transmission of a paging signal. In comparison, when UE 10 utilizes the periodically transmitted synchronization signals SCH to track the timing before paging reception, UE 10 may needs to wake up significantly earlier, that is, several sub-frames prior to the transmission of a paging signal PCH, first to receive the synchronization signal and only afterward, to receive the next paging signal PCH. In the example of FIG. 2, synchronization signals SCH are transmitted four sub-frames prior to the expected transmission of a next paging signal. In this example, if UE 10 is utilizing synchronization signal SCH for time tracking, UE 10 may wake up to receive its synchronization signal SCH, and then wait several sub-frames, during the interim, in an awake mode to monitor receipt of a paging signal PCH that may be transmitted during the next paging slot. Thus, in a worst case, the UE 10 might need to wake up several sub-frames prior to transmission of the paging signal PCH. For example, there can be a specific configuration where the synchronization signal SCH and paging channel are in the same sub-frame. The UE 10 can first use synchronization signal SCH for time tracking and then decode the paging channel. In a case where the UE 10 wakes up for synchronization signal SCH for time tracking several sub-frames before paging reception of paging signal PCH, it can turn into a partial sleep period until the reception of the paging signal PCH.

Irrespective of which signal is being used for time-tracking, if the UE needs to enter idle mode until the next paging period the UE 10 may calibrate the slow clock 18 according to the correct time base and then return to idle mode.

FIG. 2 also illustrates the transmission patterns of reference signals RS and synchronization signals SCH for two sub-frames, or TTIs. Each sub-frame comprises a plurality of time-frequency resource blocks, each covering interval of time and frequency resource elements. The example of FIG. 2, presents time frequency "map" that include 14 time intervals (called OFDM symbols) per sub-frame and 24 resource elements per time interval which represents only part of the frequency range. It should be noted here that the actual number of OFDM symbols and number of useful resource elements is configurable in LTE.

The reference signals RS are transmitted only in very specific OFDM symbols spread over the frequency band. In contrast, synchronization signals SCH are transmitted in a block of adjacent resource elements over a limited frequency band, typically within the middle of the frequency range of the useful frequency band. In accordance with LTE standards, the reference signals RS are spread across 1.4 MHz-20 Mz while the synchronization signal may occupy a 1.4 MHz frequency band in the middle of the frequency range.

Since the synchronization signals SCH are transmitted over an uninterrupted frequency band, the synchronization signals SCH may have a higher frequency resolution. As a result, time tracking with synchronization signals SCH may be able to track higher timing errors than reference signals RS, which may exhibit a timing ambiguity (typically about +/−10 μsec, in LTE) and thus, reference signals RS may be useful for time tracking only of relatively small timing errors. However, reference signals RS are transmitted more frequently and thus are available close to those sub-frames in which a paging signal PCH may be transmitted.

Figure 3:
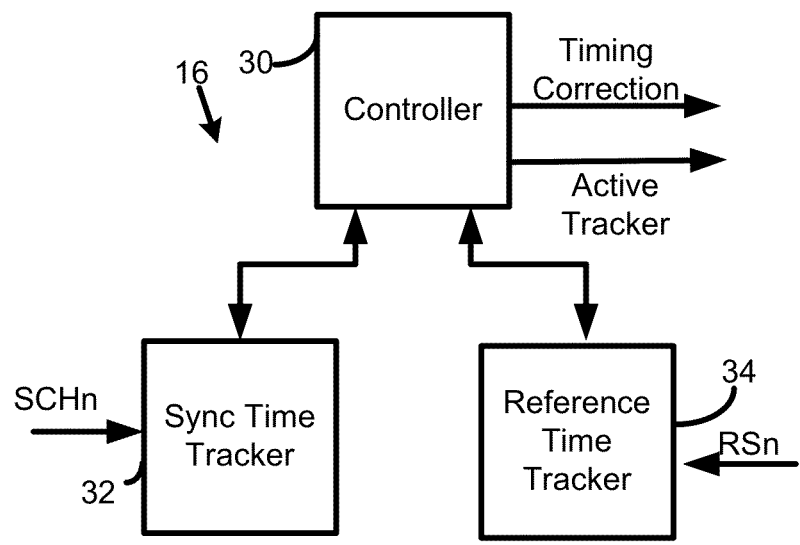
FIG. 3 is a block diagram illustration of the elements of a dual mode time tracker.

Reference is now made to FIG. 3, which illustrates elements of dual mode time tracker 16. In accordance with an embodiment, tracker 16 comprises a sync time tracker 32 (operating on a current synchronization signal SCHn), a reference time tracker 34 (operating on a current reference signal RSn) and a controller 30 to activate one of the time trackers 32, 34. Controller 30 may selectively activate sync time tracker 32 and reference time tracker 34 to change the sleep time of UE 10 with little or no impact on the decoding performance of UE 10. When relatively large sleep time errors are expected, controller 30 may activate sync time tracker 32; conversely, when relatively small sleep time errors are expected, controller 30 may activate reference time tracker 34.

Sync time tracker 32 may be embodied in any suitable element which is typically found in user equipment 10 and which operates on synchronization signal SCHn. In accordance with an embodiment, the suitable elements are configured to process the synchronization signal to, among other things, determine the timing. For example, a neighbor cell searcher processes synchronization signals to determine cell timing and to select a new cell, as necessary. Thus, a suitably configured neighbor cell searcher comprises elements capable of determining timing from a synchronization signal, particularly if, as in this embodiment, the cell is already identified.

In an embodiment, reference time tracker 34 is any suitable element which is typically found in user equipment 10 and which operates on reference signals RSn, also called "pilot signals". All such elements typically determine the timing of the reference signal in addition to their other calculations, such as channel estimation.

Figure 4:
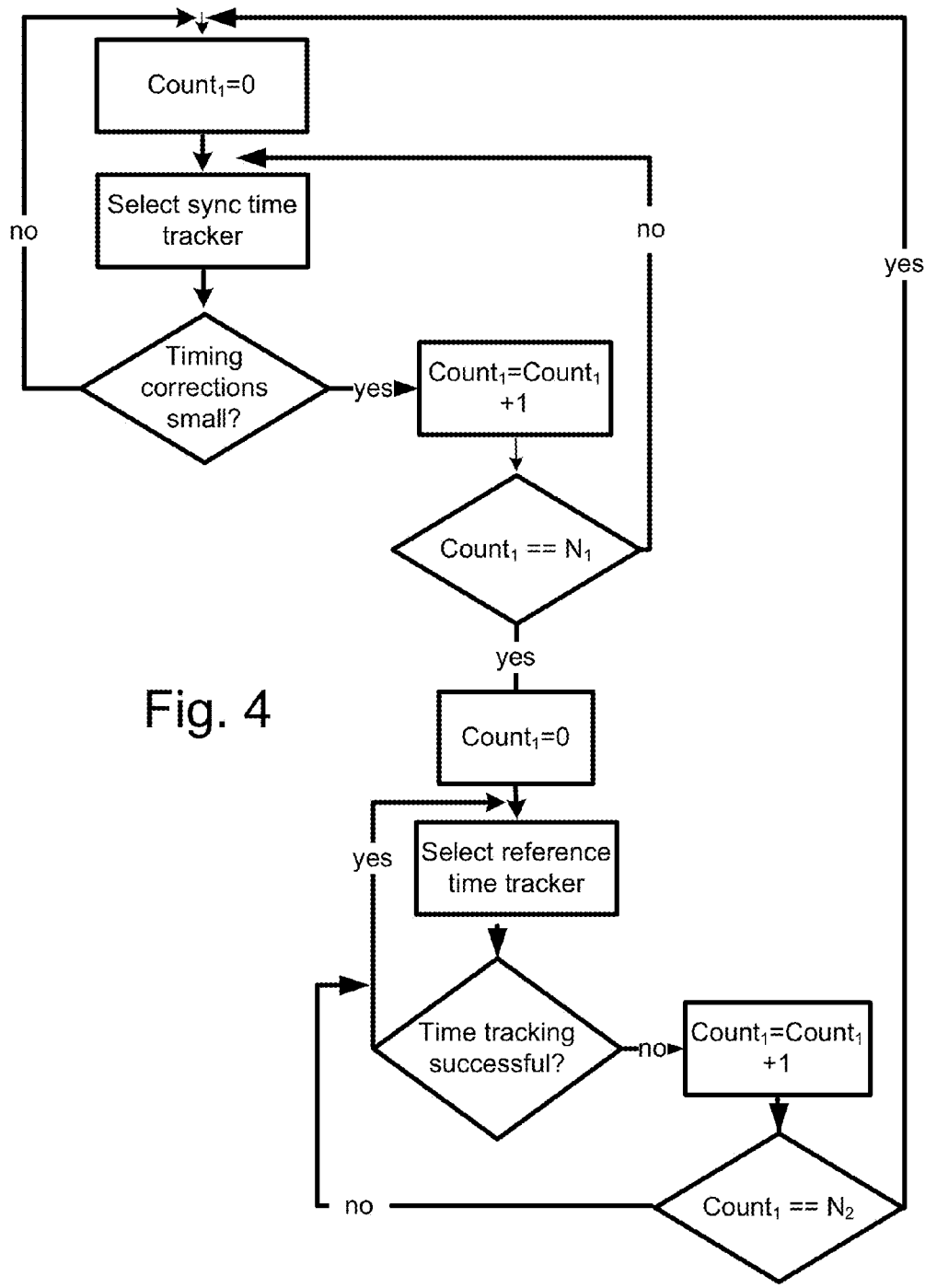
FIG. 4 is a flow chart illustration of the operation of the dual mode time tracker of FIG. 3.

For example, in accordance with an embodiment and as shown in the flowchart of FIG. 4, to which reference is now made, when in an initial state, such as after start up, controller 30 may activate sync time tracker 32. Sync time tracker 32 may use current synchronization signal SCHn to determine the current timing, and to correct the UE timing for paging reception.

Whenever timing corrections are large, sync time tracker 32 is in operation. However, once the timing corrections are small, such as less then a predefined value such as 3 µs, and the timing corrections remain small for N1 paging periods, then controller 30 may activate reference time tracker 34. Reference time tracker 34 may remain activated for as long as it can suitably track the timing. However, if, for N2 paging signals, reference time tracker 34 fails to suitably track the timing, controller 30 may revert back to making timing corrections with sync time tracker 32. In accordance with an embodiment, N1 may be 5-6 and N2 may be 1, for example.

In accordance with an embodiment, reference time tracker 34 successfully tracks the timing if time tracking corrections are small, such as less than 2 µsec, and if the signal-to-noise ratio (SNR) exceeds some threshold, for example −5 dB After timing corrections it is possible to configure the slow clock 18, for the next wakeup time. Controller 30 may also provide an indication to the slow clock unit of which time tracker 32 or 34 is currently selected, such that slow clock 18 may use this information to configure its parameters to determine next wakeup time of the UE.

Reference is now made to FIG. 5, which comparatively illustrates the sleep time of UE 10, in accordance an embodiment. FIG. 5 shows a multiplicity of sub-frames, where each set of sub-frames 0 through 9 forms a frame. Paging signal PCH is transmitted at sub-frame 4 of each frame. FIG. 5 shows only a select few sub-frames, with a gap indicated by wiggling lines.

As mentioned hereinabove, UE 10 may "go to sleep" after waking up to receive a paging signal. If sync tracker 32 is currently active, slow time clock 18 may be configured to wake up UE 10 from a short sleep period 40, in order to receive synchronization signal SCH (which may be expected, in the example of FIG. 5, at sub-frame 0). During short sleep period 40, UE 10 may turn off the receiver and various processors, except modules that may be necessary to determine when to next wake up.

However, in accordance with LTE standards and as seen in the example of FIG. 5, synchronization signal SCH may be transmitted in sub-frame 0 while paging signal PCH may be transmitted in sub-frame 4. Thus, UE 10 may wake up 4 ms before the paging signal PCH is transmitted. Sync tracker 32 may wake up for a wake period 42 during which it may process synchronization signal SCH to track the timing errors, such as those errors that are due to sleep time and/or propagation variation, after which may follow a partial sleep period 44 until paging signal PCH is expected, during which some of the modules of UE 10, may shut down.

If, instead, controller 30 activates reference tracker 34 for making timing corrections, in accordance with an embodiment slow time clock 18 will be configured to wake up UE 10 from a long sleep period 46 at the sub-frame before the next expected paging signal, in order to receive and process reference signal RS before receiving paging signal PCH. Thus, in the example of FIG. 5, long sleep period 46 ends at sub-frame 3 of the second frame and paging signal PCH begins at sub-frame 4. As seen in FIG. 5, long sleep period 46 is somewhat longer than short sleep period 40 and may avoid the need for partial sleep period 44, thus potentially reducing energy consumption over time. It should be noted that this is just an example, and in general the UE may wakeup several sub-frames before paging reception also using the reference symbol tracking approach.

In accordance with an embodiment, controller 30 may utilize other information to determine when to switch between trackers 32 and 34. For example, among the main contributors to sleep time errors are imperfections in the slow clock crystals and variations in the propagation conditions. The slow clock crystal suffers from frequency drift due to temperature variations. The temperature may change due to a change in the internal and/or external conditions of the UE, for example, the UE may have changed location from a cold location to a warm location. Alternatively, the UE may have stopped transmitting; this may also cause the temperature of the processor circuitry to cool down.

In accordance with an embodiment, controller 30 may activate sync time tracker 32 at any time whenever temperature variability may be expected, such as for a pre-determined time after the power amplifier is turned off, or until a temperature detector indicates that the temperature at the slow clock crystal has attained suitable stability. Once suitable temperature stability has been reached, in accordance with an embodiment, controller 30 activates reference time tracker 34.

Figure 6A:
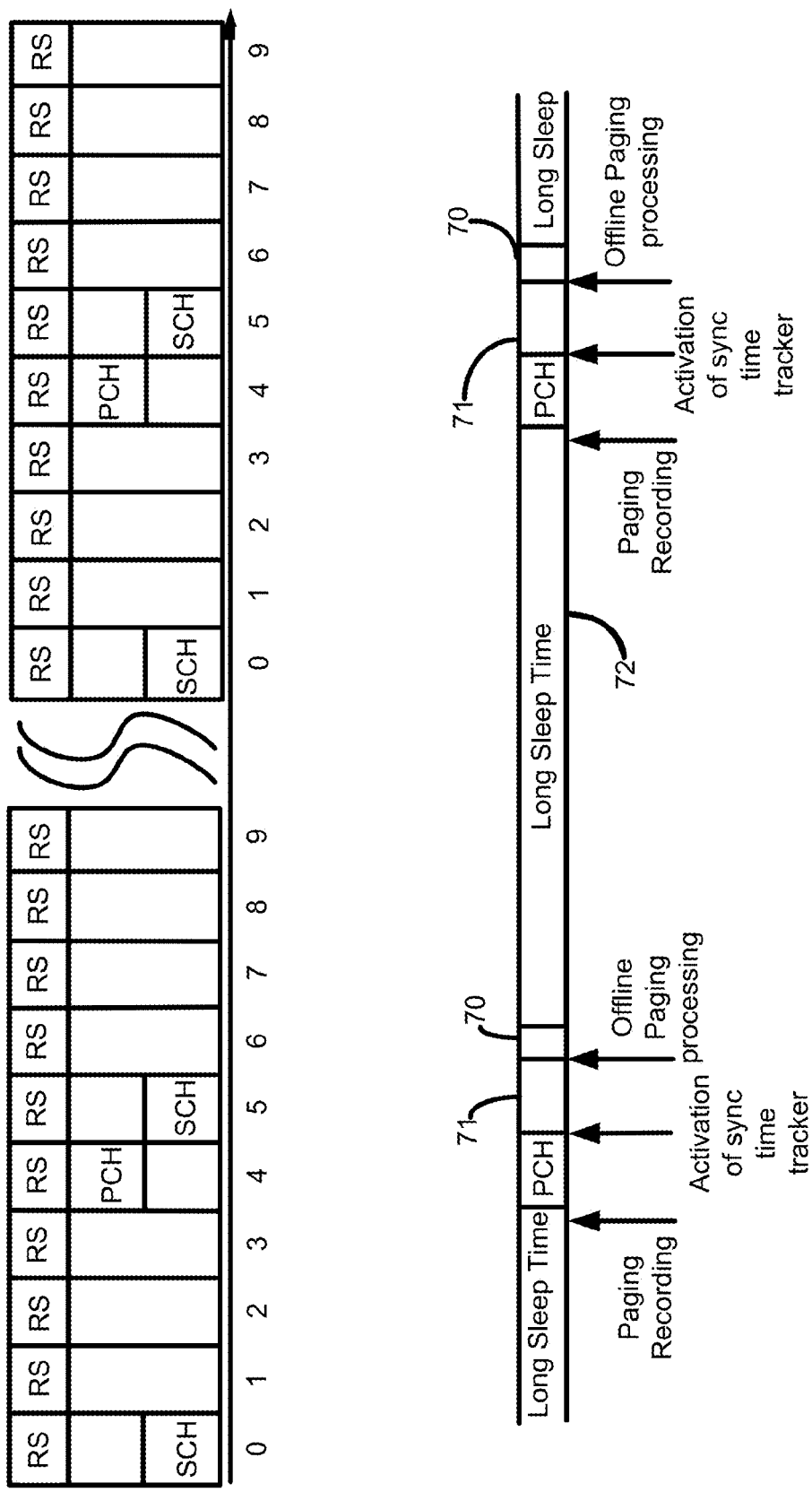
FIGS. 6A and 6B are timing diagram illustrations of alternative embodiments.
Figure 6B:
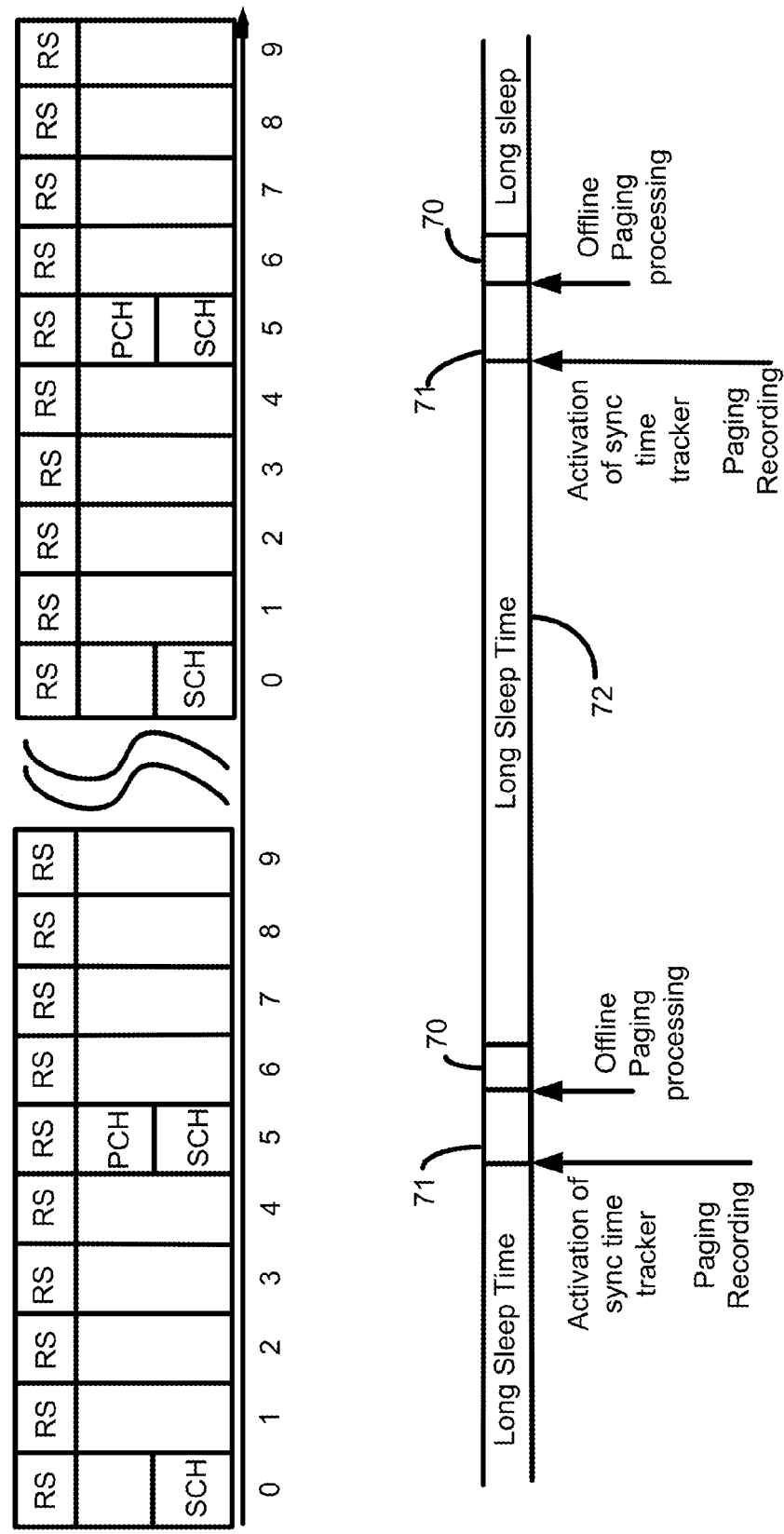

Reference is now made to FIGS. 6A and 6B, which illustrate alternative embodiments. Like FIG. 5, FIGS. 6A and 6B show a multiplicity of labeled sub-frames, where each set of sub-frames 0 through 9 forms a frame. As before, paging signal PCH is transmitted at sub-frame 4 of each frame.

In the embodiments of FIGS. 6A and 6B, controller 30 may wake up UE 10 for a synchronization signal SCH in the sub-frames close to the sub-frame of a paging signal PCH. Currently, in accordance with the LTE standard, for example, paging information may be transmitted on specific sub-frames. In accordance with current LTE standards, sub-frames in which a PCH is transmitted may be either the same sub-frame as a SCH, as shown in FIG. 6B, or one sub-frame prior to the SCH signal, as shown in FIG. 6A. In order to fully process synchronization signal SCH before processing paging signal PCH, in this embodiment, controller 30 may indicate to UE 10 to record the input samples of paging signal PCH for later processing. In accordance with an embodiment of the disclosure, since the timing errors may not yet have been corrected and thus, the exact timing not yet known, the recordation of paging signals PCH may begin before the expected timing of paging signal PCH and may end afterward.

Controller 30 activates sync time tracker 32 to detect the correct timing. UE 10 then utilizes the corrected timing while processing/decoding offline any received paging signal PCH. This methodology facilitates longer sleep times, as it eliminates or reduces the need to wakeup UE 10 significantly before the sub-frame of paging signal PCH in order to receive synchronization signal SCH.

In both FIGS. 6A and 6B, offline paging processing, labeled 70, occurs after the processing activity, labeled 71, of sync time tracker 32. Controller 30 may then indicate a long sleep time 72 once offline paging processing 70 may finish, assuming that paging signal PCH was not to page UE 10. This approach requires additional buffering in order to record at least some of the paging samples.

Unless specifically stated otherwise, as apparent from the disclosure herein, any "processing," "computing," "calculating," "determining," or similar operations, refer to operations that may be performed in dedicated computing hardware, in a generalized computer device using firmware or software.

While certain features of embodiments of the invention have been illustrated and described herein by way of example, many modifications, substitutions, variations, changes, combinations and equivalents may be apparent to those of ordinary skill in the art. Accordingly, the scope of the present invention as embodied in the claims appended hereto is intended to cover all such modifications, substitutions, variations, changes, combinations and equivalents occurring to a person of ordinary skill based on the foregoing description and which are not disclosed in the prior art.

What is claimed is:

1. A method for synchronizing a user equipment clock in a cellular telecommunications user equipment, the method comprising:
    periodically waking up the user equipment to receive signals transmitted on a cellular telecommunications network;
    selecting a synchronization mode to synchronize the user equipment clock to a network clock, based at least on one or more signals received by the user equipment while the user equipment is awake to receive signals in a first instance, wherein a first synchronization mode uses a first type of signals and a second synchronization mode uses at least a second type of signals that is different from the first type of signals;
    in response to selecting the first synchronization mode to synchronize the user equipment clock to the network clock, in a second instance that is subsequent to the first instance, waking up the user equipment for a first period of time to receive signals; and
    in response to selecting the second synchronization mode to synchronize the user equipment clock to the network clock, in the second instance that is subsequent to the first instance, waking up the user equipment for a second period of time to receive signals, such that the second period of time is different from the first period of time.

2. The method of claim 1, wherein waking up the user equipment to receive signals for the first period of time further comprises:
    in response to selecting the first synchronization mode to synchronize the user equipment clock to the network clock, waking up the user equipment to receive signals for the first period of time, such that the first period of time is sufficient to receive the first type of signals.

3. The method of claim 1, wherein waking up the user equipment to receive signals for the first period of time further comprises:
    in response to selecting the first synchronization mode to synchronize the user equipment clock to the network clock, waking up the user equipment to receive signals for the first period of time, such that the period of time is insufficient to receive the second type of signals.

4. The method of claim 1, wherein selecting the synchronization mode to synchronize the user equipment clock to the network clock further comprises:
    selecting the synchronization mode to synchronize the user equipment clock to the network clock, based at least on one or more pilot symbols received by the user equipment.

5. The method of claim 1, further comprising:
    determining that the first type of signals is not sufficiently suitable to synchronize the user equipment clock to the network clock, based at least on one or more signals received by the user equipment while the user equipment is awake to receive signals in a third instance that is subsequent to the second instance;
    based at least on determining that the first type of signals is not sufficiently suitable to synchronize the user equipment clock to the network clock, selecting the second synchronization mode to synchronize the user equipment clock to the network clock in a fourth instance that is subsequent to the third instance; and
    in response to selecting the second synchronization mode to synchronize the user equipment clock to the network clock, in the fourth instance that is subsequent to the third instance, waking up the user equipment to receive signals for the second period of time.

6. The method of claim 5, wherein waking up the user equipment in the fourth instance further comprises:
    in the fourth instance, waking up the user equipment to receive signals for the second period of time that is sufficient to receive the second type of signals.

7. The method of claim 6, wherein waking up the user equipment in the fourth instance further comprises:
    in the fourth instance, waking up the user equipment to synchronize the user equipment clock to the network clock based on the second type of signals.

8. The method of claim 1, further comprising:
    in response to the selection of the first synchronization mode, synchronizing the clock to the network clock using the first type of signals during the first period of time, the first type of signals being one or more pilot signals.

9. The method of claim 1, further comprising:
    in response to the selection of the second synchronization mode, synchronizing the clock to the network clock using at least the second type of signals during the second period of time, the second type of signals being synchronization signals.

10. A user equipment comprising:
    a clock configured to generate a clock signal and periodically wake up the user equipment to receive signals transmitted on a cellular telecommunications network; and
    a dual mode time tracker configured to select a synchronization mode to synchronize the user equipment clock to a network clock, based at least on one or more signals received by the user equipment while the user equipment is awake to receive signals in a first instance, wherein a first synchronization mode uses a first type of signals and a second synchronization mode uses at least a second type of signals that is different from the first type of signals,
    wherein the clock is further configured to, in a second instance that is subsequent to the first instance,
        (i) in response to the selection of the first synchronization mode, wake up the user equipment for a first period of time to receive signals, and (ii) in response to the selection of the second synchronization mode, wake up the user equipment for a second period of time to receive signals, such that the second period of time is different from the first period of time.

11. The user equipment of claim 10, wherein the clock is further configured to, in the second instance that is subsequent to the first instance and in response to the selection of the first synchronization mode, wake up the user equipment for the first period of time, such that the first period of time is sufficient to receive the first type of signals.

12. The user equipment of claim 10, wherein the clock is further configured to, in the second instance that is subsequent to the first instance and in response to the selection of the first synchronization mode, wake up the user equipment for the first period of time, such that the first period of time is insufficient to receive the second type of signals.

13. The user equipment of claim 10, wherein the dual mode time tracker is configured to select the synchronization mode to synchronize the user equipment clock to the network clock, based at least on one or more pilot symbols received by the user equipment.

14. The user equipment of claim 10, wherein:
the dual mode time tracker is further configured to determine that the first type of signals is not sufficiently suitable to synchronize the user equipment clock to the network clock, based at least on one or more signals received by the user equipment while the user equipment is awake to receive signals in a third instance that is subsequent to the second instance;
the dual mode time tracker is further configured to select the second synchronization mode to synchronize the user equipment clock to the network clock in a fourth instance that is subsequent to the third instance; and
in response to the selection of the second synchronization mode to synchronize the user equipment clock to the network clock in the fourth instance, the clock is further configured to, in the fourth instance, wake up the user equipment to receive signals for the second period of time.

15. The user equipment of claim 14, wherein the clock is further configured to, in the fourth instance that is subsequent to the third instance, wake up the user equipment to receive signals for the second period of time, such that the second period of time is sufficient to receive the second type of signals.

16. The user equipment of claim 14, wherein the clock is further configured to, in the fourth instance, wake up the user equipment to synchronize the clock to the network clock based on the second type of signals.

17. The user equipment of claim 10, wherein the dual mode time tracker is further configured to, in response to the selection of the first synchronization mode, synchronize the clock to the network clock using the first type of signals during the first period of time, the first type of signals being one or more pilot signals.

18. The user equipment of claim 10, wherein the dual mode time tracker is further configured to, in response to the selection of the second synchronization mode, synchronize the clock to the network clock using at least the second type of signals during the second period of time, the second type of signals being synchronization signals.

* * * * *